(12) United States Patent
Al-Kadi et al.

(10) Patent No.: US 8,607,246 B2
(45) Date of Patent: Dec. 10, 2013

(54) MULTIPROCESSOR CIRCUIT USING RUN-TIME TASK SCHEDULING

(75) Inventors: Ghiath Al-Kadi, Eindhoven (NL); Andrei Sergeevich Terechko, Eindhoven (NL)

(73) Assignee: NXP, B.V., Eindhoven (NL)

( * ) Notice: Subject to any disclaimer, the term of this patent is extended or adjusted under 35 U.S.C. 154(b) by 236 days.

(21) Appl. No.: 13/002,346

(22) PCT Filed: Jul. 2, 2009

(86) PCT No.: PCT/IB2009/052880
§ 371 (c)(1),
(2), (4) Date: Jan. 17, 2011

(87) PCT Pub. No.: WO2010/001353
PCT Pub. Date: Jan. 7, 2010

(65) Prior Publication Data
US 2011/0107345 A1    May 5, 2011

(30) Foreign Application Priority Data

Jul. 2, 2008 (EP) .................................. 08159471

(51) Int. Cl.
*G06F 9/46* (2006.01)
(52) U.S. Cl.
USPC ........................................................ 718/106
(58) Field of Classification Search
USPC ........................................................ 718/106
See application file for complete search history.

(56) References Cited

U.S. PATENT DOCUMENTS

| | | | |
|---|---|---|---|
| 5,202,987 A | 4/1993 | Bayer et al. | |
| 5,265,203 A | 11/1993 | Peaslee et al. | |
| 5,832,262 A | 11/1998 | Johnson et al. | |
| 7,502,887 B2 | 3/2009 | Tanaka et al. | |
| 2008/0098397 A1* | 4/2008 | Accapadi et al. | 718/102 |

FOREIGN PATENT DOCUMENTS

| | | |
|---|---|---|
| EP | 0 487 001 A2 | 5/1992 |
| EP | 1 416 377 A1 | 5/2004 |
| WO | 02/097562 A2 | 12/2002 |
| WO | 2005/116830 A1 | 12/2005 |

OTHER PUBLICATIONS

Kwok, Y-K., et al. "Static Scheduling Algorithms for Allocating Directed Task Graphs to Multiprocessors", ACM Computing Surveys, vol. 31, No. 4, pp. 406-471 (Dec. 1999).

(Continued)

*Primary Examiner* — Mengyao Zhe

(57) ABSTRACT

Tasks are executed in a multiprocessing system with a master processor core (10) and a plurality of slave processor cores (12). The master processor core (10), executes a program that defines a matrix of tasks at respective positions in the matrix and a task dependency pattern applicable to a plurality of the tasks and defined relative to the positions. Each dependency pattern defines relative dependencies for a plurality of positions in the matrix, rather than using individual dependencies for individual positions. In response to the program the master processor core (10) dynamically stores definitions of current task dependency patterns in a dependency pattern memory. A hardware task scheduler computes the positions of the tasks that are ready for execution at run time from information from information about positions for which tasks have been completed and the task dependency pattern applied relative to those tasks. The tasks that have been computed to be ready for execution are assigned to the slave processor cores (12).

10 Claims, 3 Drawing Sheets

(56) References Cited

OTHER PUBLICATIONS

Meenderinck, C., et al. "Parallel Scalability of Video Decoders", TU Delft CE Technical Report No. CE-TR-2008-03, 54 pgs. (Apr. 2008), retrieved from the Internet address http://ce.et.tudelft.nl/publicationfilers/1516_68_h264_parallelsim_report.pdf.

Hoogerbrugge, J., et al, "A Multithreaded Multicore System for Embedded Media Processing", Trans. on HIPEAC, vol. 3, No. 2, 22 pgs. (Jun. 2, 2008), retrieved from the Internet address http://www.hipeac.net/system/files/paper_2.pdf.

Sjalander, M. "Efficient and Flexible Embedded Systems and Datapath Components—Chapter G—A Look-Ahead Task Management Unit for Embedded Multi-Core Architectures", Chalmers Univ. of Techn., Goteborg, 31 pgs. (2008) retrieved from the Internet address http://www.sjalander.com/research/pdf/PhD-20080619.pdf.

International Search Report and Written Opinion for Int'l. Patent Appln. No. PCT/IB2009/052880 (Oct. 27, 2009).

\* cited by examiner

MULTIPROCESSOR CIRCUIT USING RUN-TIME TASK SCHEDULING

FIELD OF THE INVENTION

The invention relates to a multi-processor system and to a method of executing a collection of tasks using a multi-processor system.

BACKGROUND OF THE INVENTION

U.S. Pat. No. 5,832,262 describes the use of real-time hardware scheduling to assign tasks to different processors of a multi-processor system. The system comprises a scheduling processor and a plurality of processors that act as slaves to execute tasks scheduled by the scheduling processor. The scheduling processor identifies tasks to be executed and places them in a queue of executable tasks. Available slaves execute the tasks from the queue, under control of a real-time hardware scheduler.

U.S. Pat. No. 5,832,262 does not specify how the scheduling processor selects tasks to be placed in the queue, but it is known to use a task graph for this purpose. The task graph expresses relations between tasks, indicating for each task which predecessor tasks must have been completed before the task can be executed. Thus, a task can be placed in the queue for execution when it is has been detected that the predecessors specified in the task graph have completed execution. U.S. Pat. No. 5,832,262 uses pre-compiled scheduling based on priorities that define the relative urgencies of the tasks, but not on data dependency.

Conventionally, task graphs are prepared by the programmer or a compiler, by identifying variables used in a task and tracing to the tasks that produce these variables. For a large set of tasks a task graph can become quite extensive. Moreover, static task graphs are presumed. The tasks have to be formulated in such a way that dynamically variable dependency does not occur between tasks. Thus in image processing applications for example, it is excluded to realize static task graphs handling variable dependency as a result of variable motion vectors other than by expressing dependency in terms of dependence on images as a whole.

SUMMARY OF THE INVENTION

Among others, it is an object to provide for scheduling of tasks in a multiprocessing system without requiring a static task graph.

A multiprocessing system according to claim 1 is provided. Herein slave processor cores perform tasks defined from a program executed by a master processor core. The tasks are identified by position in an organizational matrix. The master processor core defines a relative dependency pattern applicable to a plurality of positions in the matrix. The dependency pattern can be applied to each one of the plurality of positions to obtain a respective set of further positions of tasks on which the task at said one of the plurality of positions depends. The task dependency pattern may comprise vectors to left and upper neighbors in the matrix for example. In an embodiment the task dependency pattern may depend on run-time variable data. In an image processing example, the positions in the matrix correspond to positions in an image.

In an embodiment with a hardware task scheduler this approach has been found to enable a speed up of task scheduling of seven times compared to software task scheduling and an overall reduction of 15% of a H.264 video decoding task.

A hardware task scheduler schedules tasks on the slave processor cores using the task dependency pattern defined by the program. A dependency pattern memory is used to supply the task dependency pattern to the hardware task scheduler for application to different positions.

In an embodiment a plurality of task dependency patterns may be available simultaneously, for application to respective different classes of tasks or classes of positions of tasks in the matrix. Thus for example, different dependency patterns may be provided for positions near the edges of the matrix and further away from the edges, or from one image to another dependent on the type of image (for example I, P or B frame in an MPEG image processing task). In this embodiment, the hardware task scheduler selects task dependency patterns from the memory of simultaneously active task dependency patterns based on the class of the task or the position for which the computation is performed.

In an embodiment the hardware task scheduler receives identifications of positions of tasks that have been completed and applies an inverse of the task dependency pattern applied to the positions of tasks that have been completed in response to reception of the identification. In this way the hardware task scheduler generates candidate tasks that may subsequently be screened based on the task dependency pattern to determine whether they are ready for execution.

The matrix may have two or more dimensions. When a two dimensional matrix is used the task dependency pattern may be expressed with relative dependency vectors with non-zero components in said at least two dimensions. When a three or higher dimensional matrix is used the task dependency pattern may be expressed with relative dependency vectors with non-zero components in three or more dimensions.

BRIEF DESCRIPTION OF THE DRAWINGS

These and other objects and advantageous aspects will become apparent from a description of exemplary embodiments, using the following Figures.

DETAILED DESCRIPTION OF EXEMPLARY EMBODIMENTS

Figure 1:
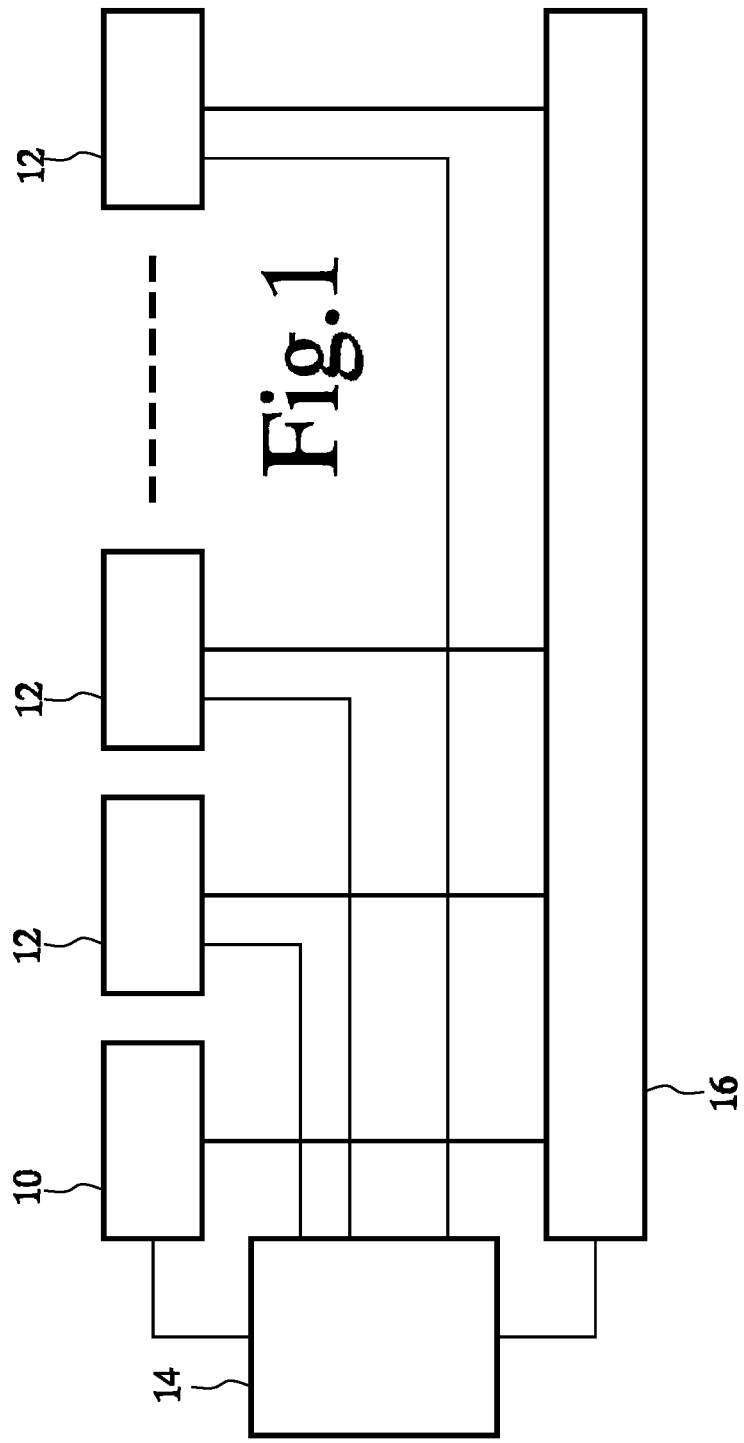
FIG. 1 shows a multiprocessing system

FIG. 1 shows a multiprocessing system comprising a master processor core 10, a plurality of slave processor cores 12, a hardware task scheduler 14 and a shared memory 16. Shared memory 16 is coupled to master processor core 10, plurality of slave processor cores 12 and a hardware task scheduler 14. Hardware task scheduler 14 is coupled to master processor core 10 and the plurality of slave processor cores 12.

In operation master processor core 10 executes a program of instructions that includes instructions to initiate execution a set of tasks by slave processor cores 12. The number of tasks in the set may exceed the number of available slave processor cores 12, so that at least one of slave processor cores 12 may each need to execute a plurality of the tasks in the set. Hardware task scheduler 14 acts as an intermediary between master processor core 10 and slave processor cores 12. The instructions to initiate execution the set of tasks cause master processor core 10 to send signals to hardware task scheduler 14, the instruction identifying the tasks in the set, a repetitive dependency pattern between the tasks for a class of positions in the set and optionally a boundary dependency pattern for a further class of positions in the set and/or parameters of the tasks. In an embodiment, the repetitive dependency patterns may be changed dynamically.

Figure 2:
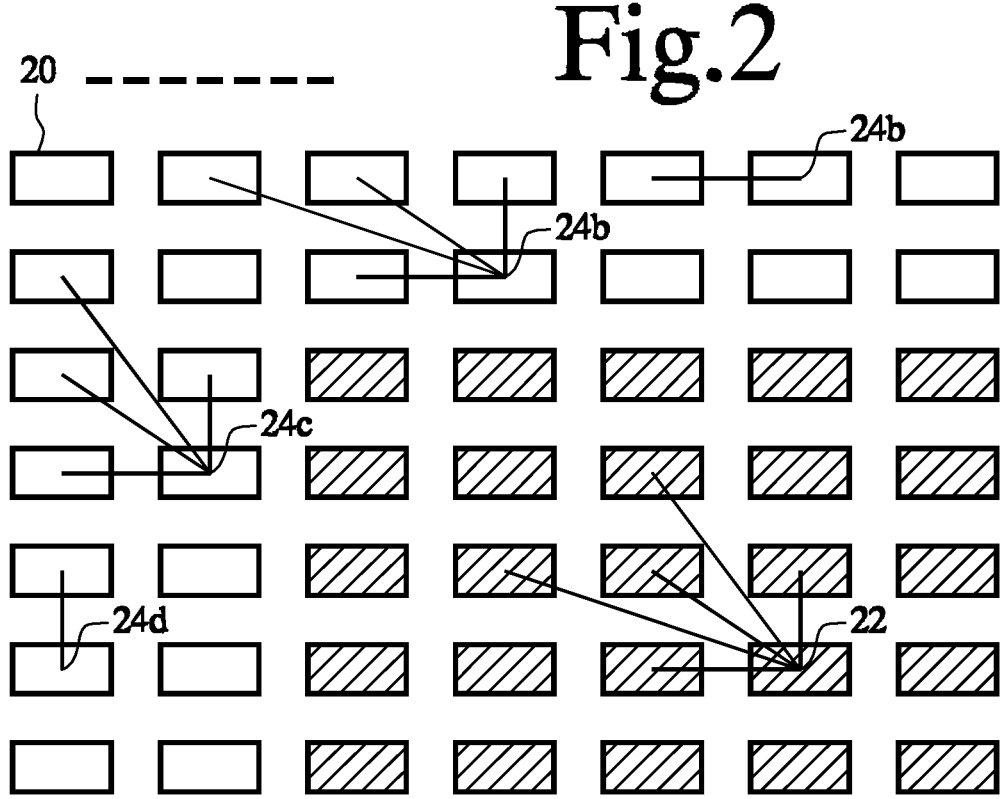
FIG. 2 shows a two dimensional pattern of dependencies

FIG. 2 illustrates a set of tasks 20 and dependency patterns 22, 24a-d between the tasks. The tasks 20 are shown in a two dimensional matrix of positions, wherein the tasks are identified by their positions. An example of tasks that can be identified in this way are image processing tasks associated with respective pixels, or blocks of pixels, of a two-dimensional image, where the program for executing the task may be the same for each pixel, or block of pixels. The dependency patterns 22, 24a-d are each illustrated by means of lines from tasks that generate data to a single task that uses the generated data. Although not shown, it should be understood that each dependency pattern is applicable to a plurality of positions.

Each task in the matrix may be identified by a task program and its position in the matrix. The programs of tasks at different positions may be the same. Translated versions of the dependency patterns 22, 24a-d apply to a plurality of tasks at mutually different positions. By way of example, translated versions of a first dependency pattern 22 apply to generation of data used by tasks at positions in a two-dimensional sub-matrix of the matrix of tasks (shown by shading), the positions of the tasks of the sub-matrix lying a predetermined number of rows and columns more than a threshold distance from certain boundaries of the matrix. Translated versions of a second and third dependency pattern 24a-b apply to generation of data used by tasks with positions along a first boundary of the matrix. Translated versions of a fourth and fifth dependency pattern 24c-d apply to generation of data used by tasks with positions along a second boundary of the matrix.

Some tasks may not depend on data generated by other tasks in the set. This may apply for example to the task for the position at the upper left corner of the matrix. This may be said to a trivial dependency pattern (not shown in the Figure), without lines.

Although a two-dimensional matrix is shown by way of example, it should be appreciated that higher or lower dimensional matrices may be used, with corresponding higher or lower dimensional dependency patterns.

Figure 3:
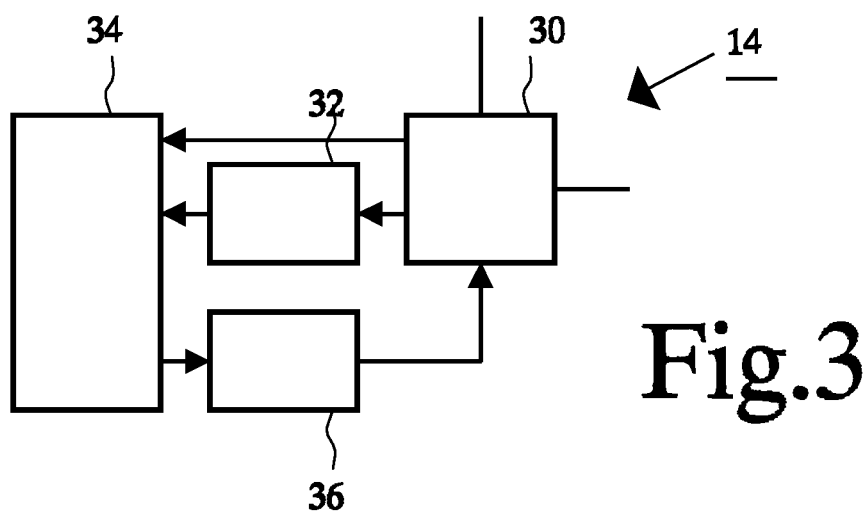
FIG. 3 shows a hardware task scheduler

FIG. 3 shows an embodiment of hardware task scheduler 14. In this embodiment hardware task scheduler 14 comprises a control unit 30, a dependency pattern memory 32, a task preparation circuit 34 and a task buffer 36. Dependency pattern memory 32 may also be located outside hardware task scheduler 14. Control unit 30 has inputs coupled to master processor core 10 (not shown) and to task buffer 36. Control unit 30 has interfaces coupled to master processor core 10, slave processor cores 12 and shared memory 16 (not shown). Control unit 30 has outputs coupled to dependency pattern memory 32 and task preparation circuit 34 and an input coupled to task buffer 36. Task preparation circuit 34 has an input coupled to dependency pattern memory 32 and an output coupled to task buffer 36.

In operation hardware task scheduler 14 serves to control when the slave processor cores 12 are allowed to execute an instance of an identified task for respective positions in a matrix. At its interface to master processor core 10 control unit 30 receives a task identification from master processor core 10 (not shown) accompanied by a specification of a repetitive dependency pattern of the task and optionally one or more of boundary dependency patterns, parameters of the task and an indication of an initial position.

The task identification may be implemented as a pointer to a program of instructions for implementing the task. The specification of the repetitive dependency patterns may be implemented as operands defining the x and y components of vectors corresponding to the arrows of dependency patterns 22, 24a-d. In addition information may be supplied to link respective ones of the dependency patterns to respective sets of positions defined relative to the boundaries of the matrix.

Upon reception, control unit 30 writes the received specification of a repetitive dependency pattern between tasks and optionally boundary dependency patterns to dependency pattern memory 32. Moreover, control unit 30 signals slave processor cores 12 (not shown) to prepare execution of the identified task, without specifying the position in the matrix for which the task must be executed. In response slave processor cores 12 load the program or programs of instructions for executing the identified task. The loaded program may be the same for each of the slave processor cores 12.

It may be noted that in some embodiments part of the dependencies may not need to be written to dependency pattern memory 32. In the example of FIG. 2, wherein pattern 22 comprises dependencies (−1,0), (0,−1), (−1,−1) (−2,−1) and (−1,−2), it can be shown that that tasks at relative positions (−1,0), (0,−1) can only start when the tasks for the other relative positions (−1,−1) (−2,−1) and (−1,−2) have finished. Hence, the latter dependencies need not be written to dependency pattern memory 32 for the purpose of run-time scheduling. Master processor core 10 may be configured to screen dependencies that are redundant for the purpose of scheduling and to write only non-redundant dependencies to dependency pattern memory 32. When data dependent dependencies are used, data dependent screening may be used, each time when new dependencies are generated, before writing dependencies to dependency pattern memory 32.

Next, slave processor cores 12 start supplying request signals to control unit 30 to request assignment to a position in the matrix and permission to start execution for that position. Slave processor cores 12 may comprise task independent shell programs for doing so. Once a slave processor core 12 receives an assignment to a position in the matrix and permission to start execution for that position, the slave processor core 12 executes the program. During the execution the slave processor core 12 may load parameters and/or data generated by other tasks from shared memory 16 and/or from hardware task scheduler 14. Similarly, the slave processor core 12 may write data generated by the executed task to shared memory and/or hardware task scheduler 14. When the slave processor core 12 finishes, it signals this to hardware task scheduler 14.

Hardware task scheduler 14 or slave processor core 12 may record completion for in a memory region. This memory region may be implemented in a task position map memory in hardware task scheduler 14, or this memory may be part of shared memory 16 for example. The memory region may contain a flag array, with array locations corresponding to positions in the matrix. In this case, the position in the matrix may be used as an index to write a completion flag at the corresponding location in the array in the memory region.

Alternatively, a wavefront code may be stored in the memory region. This saves space. When the dependencies include dependencies on the direct neighbors in the array, it is ensured that there is a wavefront, i.e. one contour or surface in the matrix that separates completed and not completed locations. In this case there are no isolated completed positions surrounded by non completed positions or vice versa. In this case the memory region stores a wavefront code representation of a path or surface in the matrix of locations at the edge between locations for which the task has been completed and locations for which the task have not yet been completed. In the case of a two dimensional matrix, the path representation may comprise a series of codes, representing the directions of successive steps along the path. The path is updated each time when a task for a location is completed, for example by modifying the codes for the steps related to that location. Later on, a test whether the task for a position has been completed is performed by testing the position relative to the wavefront.

In an embodiment the control unit 30 responds to the request signals from slave processor cores 12 by taking identifications from positions in the matrix from task buffer 36, supplying acknowledge signals and identifying the positions to said one of the slave processor cores 12. Initially control unit 30 may an initial position from the matrix, e.g. the position at the upper left, and responds to the request signal from one of the slave processor cores 12 by supplying an acknowledge signal and identifying this position to said one of the slave processor cores 12.

Figure 4:
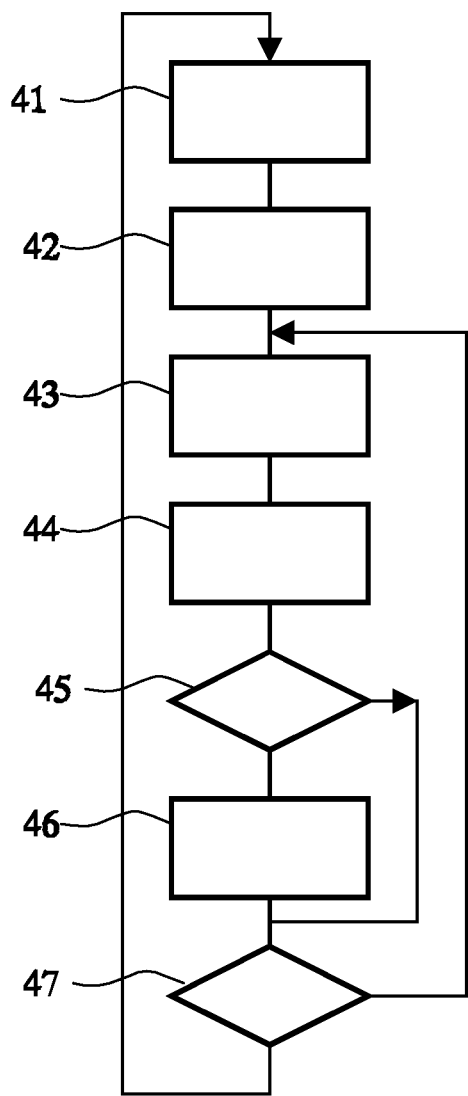
FIG. 4 shows a flow chart of task generation

Task preparation circuit 34 adds new positions of tasks that depend on results for previous positions in task buffer 36 as execution of tasks for previous positions complete. FIG. 4 shows a flow-chart of an embodiment of operation of task preparation circuit 34. In this embodiment control unit 30 detects the positions of tasks that have been completed by slave processor cores 12 and signals these positions to task preparation circuit 34. In a first step 41 task preparation circuit 34 receives an indication of a position of a task that has been completed. In a second step 42 task preparation circuit 34 uses the inverse of vectors of the dependencies in dependency pattern memory 32 to identify positions of candidate tasks that depend on the completed task. Thus, for example, if the dependency patterns specify vectors (−1,0), (−1,−1) and (0, −1), completion of a task for position (x,y) would result in the identification of candidate positions (x+1,y), (x+1,y+1) and (x,y+1).

In a third step 43 task preparation circuit 34 selects a candidate task. In a fourth step 44 task preparation circuit 34 uses the vectors of the dependency patterns in dependency pattern memory 32 to identify positions of predecessor tasks of the selected candidate task. In a fifth step 45 task preparation circuit 34 tests whether the predecessor tasks at these positions have all completed. If so task preparation circuit 34 executes a sixth step 46, placing an indication of the position of the candidate task in task buffer 36. After sixth step 46 or, if the predecessor tasks have not all been completed, after fifth step 45, task preparation circuit 34 executes a seventh step 47 to determine whether all candidate tasks have been considered. If not, the process repeats from third step 43. Otherwise, task preparation circuit 34 returns to first step 41, to wait for the identification of the position of another task that has been completed.

As an alternative to this process task preparation circuit 34 may repeatedly scan through all tasks in the matrix that have not yet started execution, using those tasks as candidate tasks to determine positions of tasks for which all predecessor tasks have been completed and to place indications of positions of those tasks in task buffer 36. This requires more time than the process of FIG. 4. When a wavefront code is used to represent the boundary between completed and uncompleted tasks, such a scan can be replaced by selecting any position on the boundary represented by the wavefront.

Control unit 30 consults task buffer 36 when it detects that a slave processor core 12 requests a new task. Control unit 30 sends an indication of the position of the task from the task buffer to the requesting slave processor core 12 and removes this position from task buffer 36.

In an embodiment control unit 30 writes to the task position map memory each time when it detects completion of a task, to indicate for the position of that task that the task for that position has completed. In this embodiment task preparation circuit 34 may read from the task position map memory to determine whether tasks for selected positions have been completed. When a wavefront code is used, fifth step 45 comprises testing whether the positions of predecessor tasks are on the side of the wavefront corresponding to completed tasks. The position of the update of the wavefront code for the position that was used to generate the candidate (the position received in first step 41) may be used as a starting point for this determination. This makes it unnecessary to scan through the entire wavefront code for this purpose.

In an embodiment, respective different repetitive dependency patterns may be used for tasks at respective different classes of positions. Thus, for example a first set of dependency patterns may be used for tasks with positions on a first boundary of the matrix, not being the position in a corner, a second set of dependency patterns may be used for tasks with positions on a second boundary of the matrix, not being the position in a corner, and a third set of dependency patterns may be used for tasks with positions not on the first and second boundaries.

In one embodiment this is supported by using a plurality of sets of dependency patterns in the matrix. Alternatively, a plurality of matrices may be used. In the embodiment wherein a plurality of sets of dependency patterns within the same matrix is used, this is supported by storing a plurality of sets of dependency patterns in dependency pattern memory 32, for respective classes of positions in the matrix, based on information provided by master processor core 10. In addition master processor core 10 provides information linking the classes of positions to the respective sets of dependency patterns. This information is sent to task preparation circuit 34. Task preparation circuit 34 is configured to identify the class of each candidate task, to select the set of dependency patterns applicable to that position and to use this selected set of dependency patterns to test whether all predecessor tasks of the candidate task have been completed. Identification of the class of a candidate task may comprise detecting whether its position is located on a boundary of the matrix for example, or determining the number of rows and/or columns from the position of the task to the boundary and selecting the set of dependency patterns dependent on that number or those numbers.

When a plurality of sets of dependency patterns is provided, all sets may be used to generate positions of candidate tasks in second step 42. The number of generated candidates may be reduced by taking account of the class of the candidate and eliminating the candidate if it does not belong to the class corresponding to the set of dependency patterns that has been used to generate the candidate.

In most embodiments, one set of dependency patterns leads to positions of candidate tasks that include all positions of candidate tasks derivable from the other sets of dependency patterns. In those embodiments, information may be provided to task preparation circuit 34 to identify this one set of dependency patterns, the task preparation circuit 34 being configured to use only the identified one set of dependency patterns in second step 42 to generate candidate tasks.

Alternatively, further classes may be defined for completed tasks and coupled to respective inversions of the dependency patterns, the task preparation circuit 34 being configured to identify the further class of the completed task in second step 42, and to use the inversion for that further class to generate the positions of candidate tasks.

In an embodiment slave processor cores 12 and task preparation circuit 34 may be configured to ignore dependencies that point to tasks outside the matrix. In this case a single dependency pattern may suffice for the entire matrix, without special dependency patterns for positions near the boundaries.

Control unit 30 is configured to detect whether all tasks have been completed. This may be realized for example by maintaining a counter value, representing the uncompleted tasks, decrementing the counter value each time when a task is completed and testing whether the counter value has reached zero. Upon detection of completion of all tasks, control unit 30 signals completion to master processor core 10, after which master processor core 10 may proceed with its program, executing subsequent instructions and optionally starting a new matrix of tasks.

In a further embodiment master processor core 10 is configured to proceed with execution of its program after executing instructions to start execution of a matrix of tasks, before all tasks of the matrix have been completed. In this case, master processor core 10 may execute an instruction at a later stage to test for completion.

The program of master processor core 10 may contain instructions to initiate execution of a further matrix of tasks before all tasks of a previous matrix are executed. When the program code of slave processor cores 12 for the tasks of this further matrix is the same as that for the preceding matrix, this can be realized by using an identification of the matrix in addition to the identification of position in the matrix to identify tasks. Respective sets of dependency patterns for respective matrices may be stored in dependency pattern memory 32 together. In this case, task preparation circuit 34 is configured to use the identification of the matrix as well as the identification of the position of the task in the matrix to select an applicable set of dependency patterns from dependency pattern memory 32.

In a further embodiment the dependency patterns may include dependencies between different matrices may be defined. Thus for example a dependency pattern (0,0,−1) to indicate dependency of a task at a position in a current matrix on a corresponding position in a previous matrix (indicated by "−1"). In this embodiment task preparation circuit 34 is configured to use the identification of the matrix as well as the identification of the position of the task in the matrix to select an applicable set of dependency patterns from dependency pattern memory 32 for each task, to tests whether all predecessor tasks have been completed and optionally to generate candidate tasks.

Such an embodiment may be used to give special treatment to boundaries. In this case a matrix of tasks may be represented in instructions from master processor core 10 as a series of matrices, representing a row at the top boundary, a column at the left boundary and a remaining submatrix respectively. In this case master processor core 10 may execute instructions to start tasks for the row matrix, the column matrix and the remainder matrix successively, signaling dependency patterns within these matrices and between these matrices to hardware task scheduler 14.

In one embodiment the program code of slave processor cores 12 is the same for tasks at all positions in all matrices, it being understood that within this program code there may be jumps to or around different parts of the code, dependent on the matrix or position in the matrix. Thus slave processor cores 12 can perform tasks for different positions and matrices in quick succession. This can be realized by creation of the code by combination of programs for different matrices and different positions. In this way, all slave processor cores 12 are available for executing tasks for all matrices and all positions in the matrices. Alternatively, some slave processor cores 12 may be temporarily or permanently dedicated to specific classes of position or specific matrices, but in this case control unit 30 must select tasks from task buffer 36 dependent on the slave processor cores 12 that requests a task. This may be supported by providing a plurality of task buffers 36 for respective types of slave processor cores 12.

In the embodiment wherein dependency patterns for a plurality of matrixes are stored in dependency pattern memory 32 memory management of this memory may be used, to free memory occupied by dependency patterns when tasks for all positions in their corresponding matrices have been completed. An order of the matrices may be defined, in which the matrices will be completed one after the other due to dependencies. In this case a FIFO memory management may be used, each time discarding the first stored set of dependency patterns when tasks for all positions in their corresponding matrices have been completed.

In an embodiment at least part of the dependency patterns is selected dynamically. This may be applied for example to image decoding or encoding tasks wherein data dependent motion vectors are used, or data dependent reference images. In this embodiment master processor core 10 may select the data dependency patterns dynamically, dependent on runtime variable data and cause the selected the data dependency patterns to be stored in dependency pattern memory 32 for use by task preparation circuit 34. For example, master processor core 10 may set the dependency on another matrix dynamically and/or set the dependency pattern for an entire matrix dynamically.

In a further embodiment master processor core 10 may dynamically define classes of positions within a matrix, with a dependency pattern for each class, and cause the selected data dependency patterns to be stored in dependency pattern memory 32 for use by task preparation circuit 34.

Task preparation circuit 34 may be implemented as a programmable circuit, with a stored program for executing the described functions. Alternatively, a dedicated circuit may be used to perform these functions, using arithmetic circuits to compute positions of tasks from positions of other tasks and dependency patterns.

Although a single master processor core 10 has been shown by way of example, it should be understood that a plurality of master processor cores may be used. Optionally, one or more of the slave processor cores may double as master processor core.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A multiprocessing system comprising:
   a plurality of slave processor cores configured to execute tasks that are at least partially identified by positions in a matrix;

a dependency pattern memory;

a master processor core configured to execute a program that includes instructions that define the tasks, the matrix and a task dependency pattern applicable to each of a plurality of the tasks, the master processor core being configured to cause the task dependency pattern to be stored in the dependency pattern memory; and a hardware task scheduler coupled to the master processing core, the slave processor cores and the dependency pattern memory, the hardware task scheduler being configured to assign tasks that are ready for execution to the slave processor cores, the hardware task scheduler being configured to compute positions of the tasks that are ready for execution at run-time from information about further positions for which tasks have been completed and the task dependency pattern applied to those further positions, wherein the hardware task scheduler is configured to receive identifications of positions of tasks that have been completed and to use an inverse of vectors of the task dependency pattern applied to the further positions of tasks that have been completed in response to reception of the identification to generate candidate tasks and to identify the tasks that are ready for execution by screening the candidate tasks based on the task dependency pattern.

2. A multiprocessing system according to claim 1, wherein the dependency pattern memory is configured to store a plurality of task dependency patterns simultaneously, applicable to tasks from one of respective different classes of tasks and respective classes of positions of tasks in the matrix, the hardware task scheduler being configured to select task dependency patterns to the compute positions of the tasks that are ready for execution at run-time from the dependency pattern memory based on the class of the task or the position for which the computation is performed.

3. A multiprocessing system according to claim 2, wherein the hardware task scheduler is configured to distinguish different ones of the classes of positions dependent on at least distance from the positions in the class to an edge of the matrix.

4. A multiprocessing system according to claim 1, wherein the master processor core is configured to select the task dependency pattern dependent on run-time variable data.

5. A multiprocessing system according to claim 1, wherein the matrix has at least three dimensions, the task dependency pattern comprising relative dependency vectors with non-zero components in said at least three dimensions.

6. A multiprocessing system according to claim 1, further comprising a memory region for representing a wavefront code of positions in the matrix separating positions of completed tasks from positions of not completed tasks.

7. A method of executing tasks in a multiprocessing system with a master processor core and a plurality of slave processor cores, the method comprising:

executing a program in the master processor core, defining a matrix of tasks at respective positions in the matrix and a task dependency pattern applicable to a plurality of the tasks and defined relative to the positions;

run-time computing of positions of the tasks that are ready for execution from information about positions for which tasks have been completed and the task dependency pattern applied relative to those tasks;

assigning the tasks that have been computed to be ready for execution to the slave processor cores; and receiving identifications of positions of tasks that have been completed and using an inverse of vectors of the task dependency pattern applied to the further positions of tasks that have been completed in response to reception of the identification to generate candidate tasks and to identify the tasks that are ready for execution by screening the candidate tasks based on the task dependency pattern.

8. A method according to claim 7, wherein the program in the master processor core defines the task dependency pattern dependent on run-time variable data.

9. A method according to claim 7, wherein the program in the master processor core defines a plurality of task dependency patterns, for one of respective different classes of tasks and classes of positions of tasks in the matrix, said run-time computation comprising computing positions of the tasks that are ready for execution at run-time from the dependency pattern memory based on the class of the task or the position for which the computation is performed.

10. A method according to claim 7, wherein the matrix is an at least three dimensional matrix the task dependency pattern for at least a class of the positions comprising relative dependency vectors with non-zero components in said at least three dimensions.

* * * * *